United States Patent [19]

Müller et al.

[11] Patent Number: 4,460,074
[45] Date of Patent: Jul. 17, 1984

[54] CONTINUOUSLY OPEN THROTTLING FLUID PASSAGE DEVICE FOR SHOCK ABSORBERS

[75] Inventors: Gerd Müller, Lülsfeld; Manfred Koller, Obbach; Heinz Sydekum, Dittelbrunn, all of Fed. Rep. of Germany

[73] Assignee: Fichtel & Sachs AG, Schweinfurt, Fed. Rep. of Germany

[21] Appl. No.: 337,467

[22] Filed: Jan. 6, 1982

[30] Foreign Application Priority Data

Jan. 14, 1981 [DE] Fed. Rep. of Germany ....... 3100886

[51] Int. Cl.³ ............................................. F16F 9/348
[52] U.S. Cl. ............................ 188/322.14; 188/322.15
[58] Field of Search ............... 188/317, 318, 319, 320, 188/322.13, 322.14, 322.15

[56] References Cited

U.S. PATENT DOCUMENTS 2,320,697  6/1943  Binder .......................... 188/322.14
2,676,676  4/1954  Strauss et al. ......................... 188/320
3,837,445  9/1974  Pierle ............................. 188/322.15

FOREIGN PATENT DOCUMENTS

951693  10/1956  Fed. Rep. of Germany ........................ 188/322.15
1242056  6/1967  Fed. Rep. of Germany ........................ 188/322.15

Primary Examiner—Duane A. Reger
Attorney, Agent, or Firm—Toren, McGeady and Stanger

[57] ABSTRACT

In the illustrative embodiments described, a double tube shock absorber is provided with a continuously open throttling fluid passage device both on the piston valve unit and the bottom valve unit. The continuously open fluid passage device comprises a fluid passage chamber defined by a first wall member and a second wall member. The fluid passage chamber is connected to a first fluid chamber of the shock absorber by a first axially directed opening and to a second fluid chamber of the shock absorber by a second radially directed opening. The second radially directed opening is located radially outward of said first opening. The axial height of the fluid passage chamber continuously decreases in radial direction between said first opening and said second opening.

21 Claims, 15 Drawing Figures

CONTINUOUSLY OPEN THROTTLING FLUID PASSAGE DEVICE FOR SHOCK ABSORBERS

BACKGROUND OF THE INVENTION

1. Field of the Invention

The present invention relates in general to shock absorbers and more particularly to a continuously open throttling fluid passage device for a hydraulic shock absorber.

2. The Prior Art

A continuously open throttling passage device for a hydraulic shock absorber is known, for example, from German Auslegeschrift No. 2,264,139. The known fluid passage device comprises two annular, concentric wall members substantially perpendicular to their common axis, namely a first wall member and a second wall member. The first and the second wall member define together an annular fluid passage chamber. This fluid passage chamber is connected by a first substantially axially directed opening in the first wall member to a first fluid chamber and by a second substantially radially directed opening to a second fluid chamber, said second opening being located radially outward of said first opening. In this known fluid passage device a stepwise pressure decrease occurs between the two fluid chambers when a pressure difference occurs between these two fluid chambers. The first wall member in the prior art device has a complicated shape and is, therefore, difficult and expensive in manufacturing. Moreover, due to the complicated shape of the first wall member this wall member must be assembled in a predetermined orientation, so that assembling is complicated. It has been further found that in the prior art device a fissing noise occurs if the pressure differential between the respective fluid chambers is relatively high.

For avoiding such fissing noise it is also known to arrange two or more fluid passage devices in series. Such a construction is very complicated and expensive, particularly in view of the assembling work.

SUMMARY

It is, therefore, a primary object of the present invention to provide an improved structure of a fluid passage device which is of a simplified design and avoids or, at least, reduces the fissing noise.

A further object of this invention is to provide a fluid passage device which can be easily assembled together with the remaining parts of, for example, a shock absorber.

The foregoing and other objects of the invention are attained in that the axial height of the fluid passage chamber is reduced substantially continuously from the location of the first axially directed opening towards the location of the second radially directed opening.

It has been surprisingly found that by this simple constructional feature the fissing noise has been considerably reduced as compared with the fissing noise occurring with the prior art device. Moreover, due to the new design feature of the fluid passage chamber the shape of the wall members becomes less complicated, so that the wall members can be manufactured and assembled more easily than before.

BRIEF DESCRIPTION OF THE DRAWINGS

Further objects and advantages of the invention will be apparent from the following description of exemplary embodiments thereof taken in conjunction with the accompanying drawings, wherein.

Figure 1:
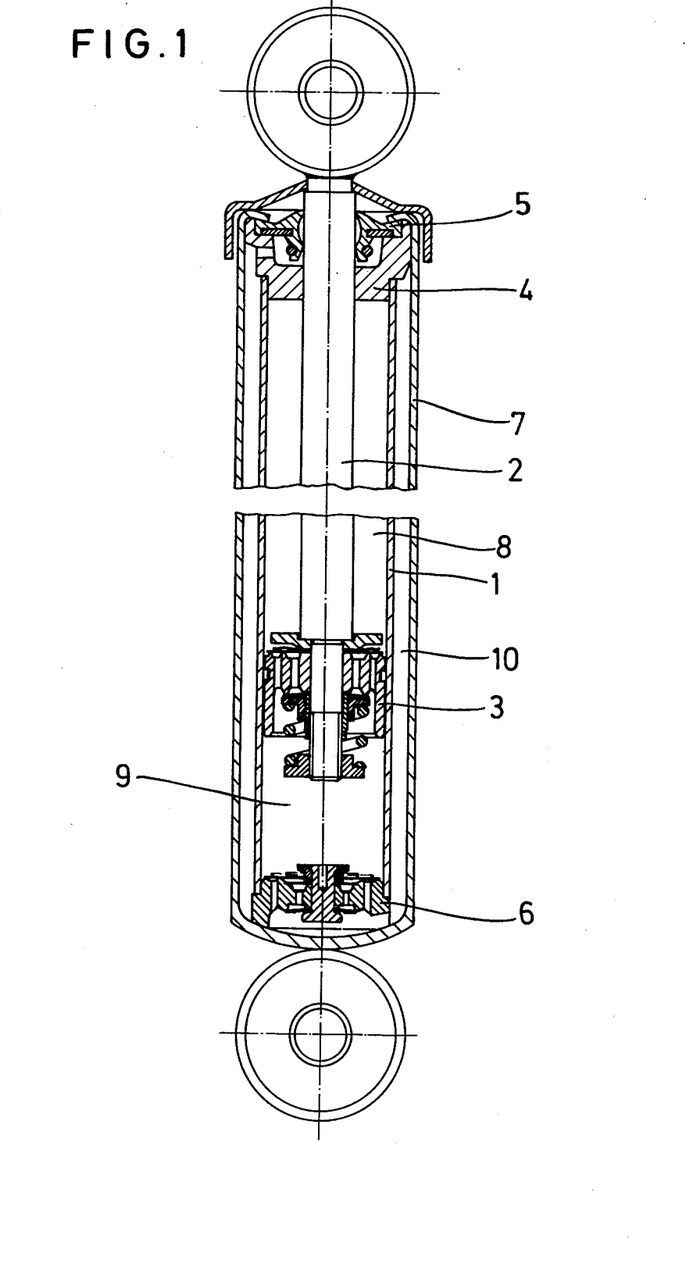
FIG. 1 shows a double-tube shock absorber in longitudinal section.

The hydraulic double tube shock absorber for motor vehicles as illustrated in FIG. 1 is installed in the usual way between the vehicle axle and the vehicle superstructure. This shock absorber consists essentially of the cylinder 1, in which a piston 3 connected with a piston rod 2 slides. The piston rod 2 is guided in the piston rod guide 4 and sealed off to the exterior by the piston rod seal 5. The cylinder 1 is centered in the container 7 by means of the piston rod guide 4 and the bottom valve 6. The interior chamber of the cylinder, filled with damping liquid, is divided by the piston 3 into the working chamber 8 above the piston and working chamber 9 beneath the piston. There is a filling of damping liquid and gas in the compensation chamber 10 formed by the outer wall of the cylinder and the inner wall of the container 7. This compensation chamber 10 is in communication with the working chamber 9 through the bottom valve 6.

The oscillations initiated by irregularities of the road while the vehicle is travelling are damped in the draw phase, that is to say in the outward movement of the piston rod 2 from the container 7, substantially by the draw stage valve situated in the piston 3, while for the compression phase, that is the driving of the piston rod 2 into the container 7, the compression stage valve situated in the bottom valve 6 predominantly takes over the damping. The compensation chamber 10 serves to compensate for the volume of the inwardly driving piston rod.

Figure 2:
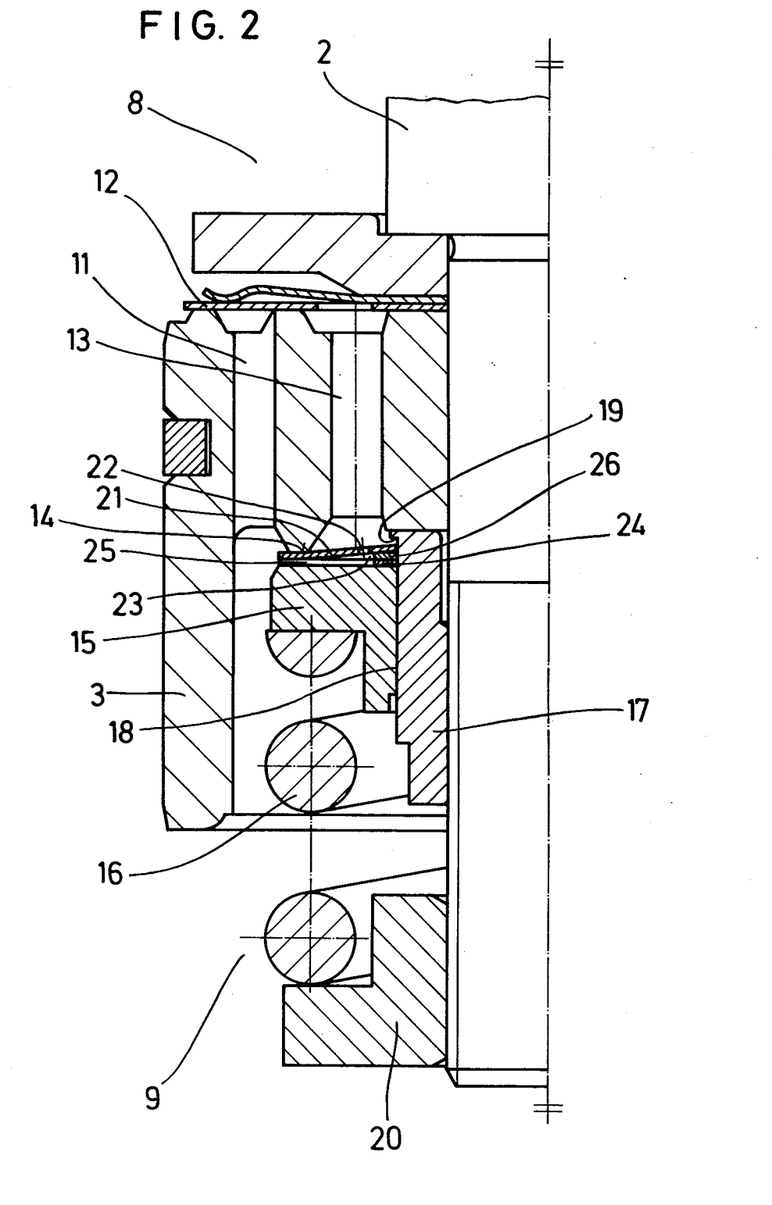
FIG. 2 shows the piston according to FIG. 1, provided with the damping valves, in enlarged representation.

The enlarged illustration according to FIG. 2 shows details of the damping piston 3 as entered in FIG. 1. The damping passages 11 are allocated to the compression stage and are closed by the spring plate valve 12. Here a spring of star-shaped formation clamped in with the valve plate on the inner circumference acts upon the valve plate and effects a relatively low spring force of the compression stage valve, so that the latter opens at a relatively slight excess pressure in the working chamber 9 and permits the damping liquid to flow over into the working chamber 8. The damping passages 13 are allocated to the draw stage, that is when the piston rod 2 is driving outwards. Between the valve seat 14 and the valve body 15 prestressed by the valve spring 16, the wall member or orifice plate 21 and cover plate 24 are clamped. The wall member or rigid valve body 15 can move axially against the spring force of the valve spring 16 on the cylindrical section 18 of the piston securing nut 17. For the adjustment of the initial stress of the valve spring 16 there serves the adjusting nut 20 which possesses a support surface for the valve spring 16. The piston securing nut 17 carries a collar 19 in the region of the face abutting on the piston 3, which collar forms an abutment surface for the orifice plate before assembling.

Between the orifice plate 21 and the cover plate 24 the distance washer 26 is provided in the region of the internal diameter. In the case of the valve construction as shown the wall member or valve body 15 possesses a flat abutment face for the cover plate 24, so that as a result of the force of the valve spring 16 the wall member or orifice plate 21 is slightly initially stressed and domes into dished form by reason of the distance washer 26. Thus an annular space 23 is formed which is defined by the orifice plate 21, the distance washer 26 and the cover plate 24, and possesses a radially outwardly steplessly reducing cross-section. When the compression stage is not opened, thus there is a constantly opened passage cross-section between the working chambers 8 and 9, since the damping liquid can flow out of the working chamber 8 by way of the damping passage 13, the pre-opening cross-sections 22 situated in the orifice plate 21, the annular space 23 and the secondary constrictor cross-sections 25 situated in the cover plate 24, into the working chamber 9. The size and form of the annular space 23 can be modified in a simple manner merely by appropriate formation of the distance washer.

In the pre-opening phase, that is when the draw valve is closed, by reason of the arrangement of the constantly opened passage cross-section and predominantly by reason of the shaping of the annular space 23, a constant pressure reduction is achieved even in the case of relatively high speeds of flow. The annular space 23 here serves as stabilisation chamber for the liquid passing at high speed through the pre-opening cross-sections 22, so that at the exit from the secondary constrictor cross-section 25 the damping liquid enters at least largely stabilised into the working chamber 9 and thus no noises or no appreciable noises are caused.

Figure 3:
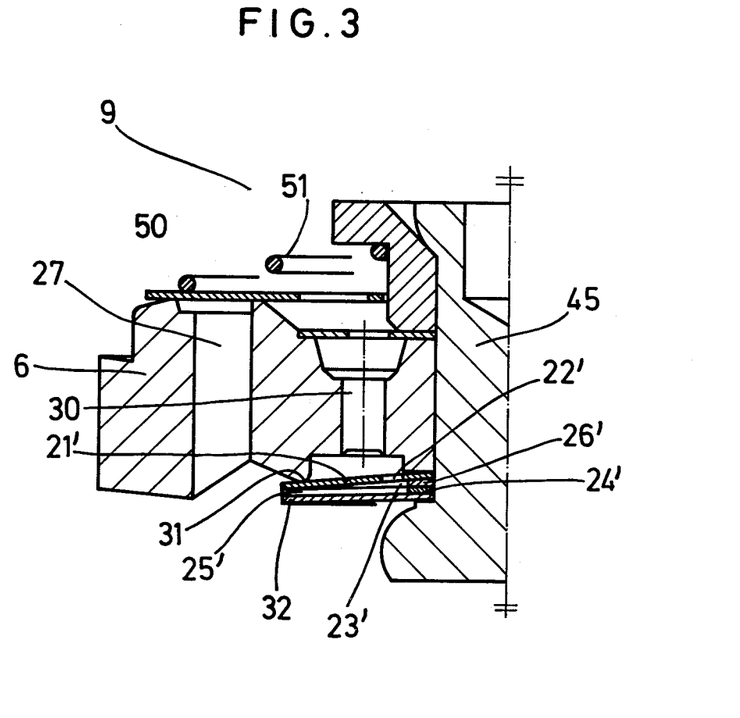
FIG. 3 shows the bottom valve according to FIG. 1 in enlarged representation.

The bottom valve body 6 as shown in FIG. 1 is represented in enlarged manner in FIG. 3. The damping passages 27 are here allocated to the draw phase and a non-return valve in cooperation with the valve plate 50 charged by a conically formed spiral spring 51. The compression stage damping valve which acts in the driving in of the piston rod comprises the damping passages 30, the orifice plate 21' resting on the valve seat 31 and carrying the pre-opening cross-sections 22', the distance washer 26', the cover plate 24' and the valve spring plate 32; these components are clamped at their internal diameter by means of the securing part 45, formed as rivet. In correspondence with the draw stage valve according to FIG. 2, in this compression stage valve likewise a gradual reduction of pressure is achieved in the constantly opened passage. This constantly opened passage is formed by the pre-opening cross-sections 22; the annular space 23' and the secondary constrictor passages 25'. The spring force of the valve is here generated by the initial stress of the plates.

According to FIGS. 1 to 3, on movement of the piston rod 2 out of the container 7 a pressure is built up in the working chamber 8 while a lower pressure prevails in the working chamber 9. In this phase the non-return valve 12 situated on the piston 3 remains closed, while damping liquid flows out of the chamber 8 and via the damping passages 13 and the pre-opening cross-sections 22 arranged in the orifice plate 21 into the annular space 23 and thence by way of the secondary constrictor cross-sections 25 of the cover plate 24 into the working chamber 9. The stabilising phase of the liquid flow then occurring was already described above. If such a high pressure builds up in the chamber 8 that the pressure difference between the working chambers 8 and 9 exerts a force upon the valve body 15 which is greater than that of the valve spring 16, then the valve body 15 is urged downwards along the cylindrical section 18 of the piston securing nut 17. The orifice plate 21 now lifts away from the valve seat 14 and the damping valve allocated to the draw stage is opened. In this draw phase a quantity of liquid corresponding to the outwardly moving piston rod volume is drawn into the working chamber 9 from the compensation chamber 10 through the non-return valve situated in the bottom valve 6 and covering the damping passages 27.

In the compression stroke, that is on movement of the piston rod 2 into the cylinder 1, the non-return valve 12 situated on the piston 3 and covering the damping passages 11 opens, whereby a flow of the damping liquid from the working chamber 9 over into the working chamber 8 takes place, while the non-return valve closing the damping passages 27 in the bottom valve remains closed. The quantity of liquid corresponding to the volume of the inwardly driving rod is forced by way of the compression valve situated on the bottom valve 6 out of the working chamber 9 into the compensation chamber 10. If the force exerted upon the plates 21', 24' and 25' as a result of the pressure difference between the working chamber 9 and the compensation chamber 10 is less than the prestress pressing these plates against the valve seat 30, the damping liquid flows by way of the pre-opening cross-sections 22' of the orifice plate 21' into the annular chamber 23' and thence by way of the secondary constrictor cross-sections 25' into the compensation chamber 10. Since the assembly of this bottom valve allocated to the compression stage corresponds as regards the constantly opened passage cross-section to that of the piston valve, renewed discussion with regard to the pressure diminution and the stabilisation of the flow and consequent noise reduction becomes superfluous. If the pressure in the working chamber 9 rises further and the pressure difference results in a force which is greater than the prestress of the plates, these lift away from the valve seat 31 and open the compression valve.

Figure 4:
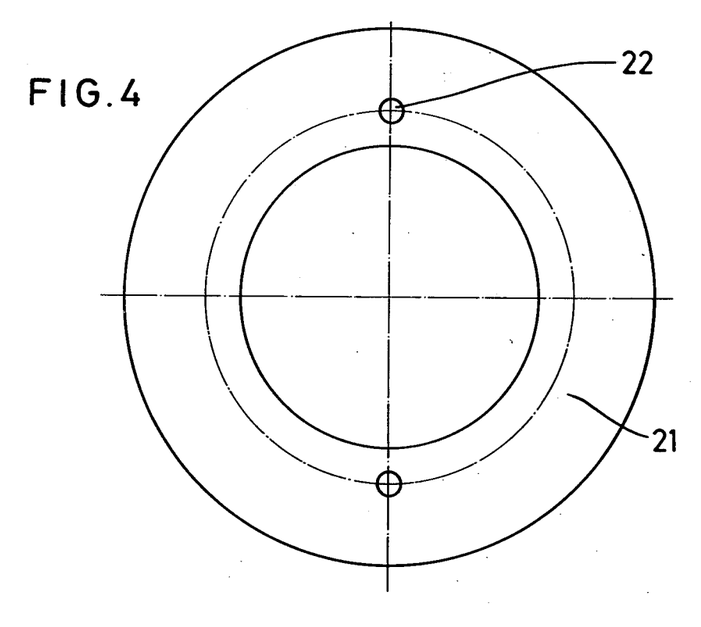
FIG. 4 shows the orifice plate in plan view.

In FIG. 4 the orifice plate 21 with the pre-opening cross-sections 22 is illustrated in plan view. This is a flat washer which can be produced very simply, which is important especially in the case of pistons with small diameters. From FIG. 1, which shows a small damping piston on the scale 1:1, it can be seen how small such valve parts can be in shock absorbers.

Figure 5:
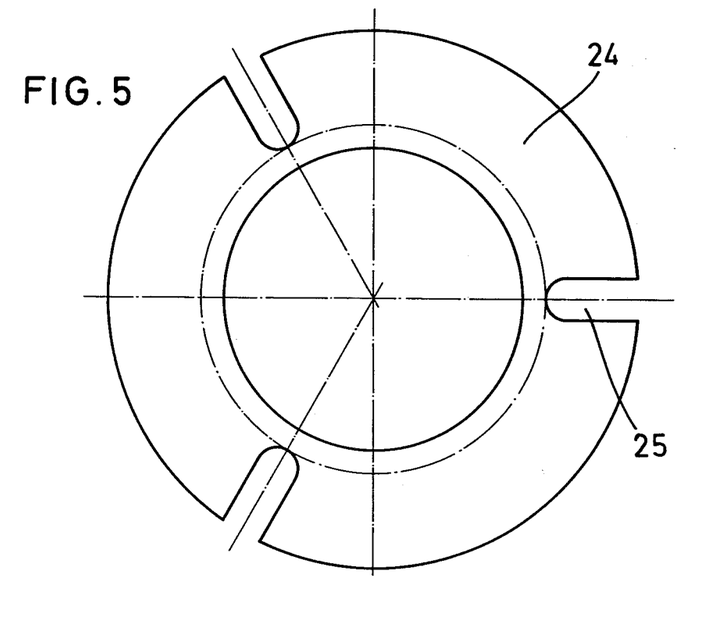
FIG. 5 shows the cover plate provided with the secondary constrictor cross-sections.
Figure 6:
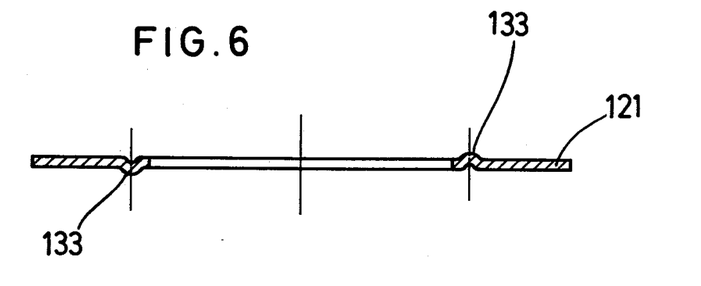
FIG. 6 shows an orifice plate in longitudinal section which at the same time forms a distance element.
Figure 7:
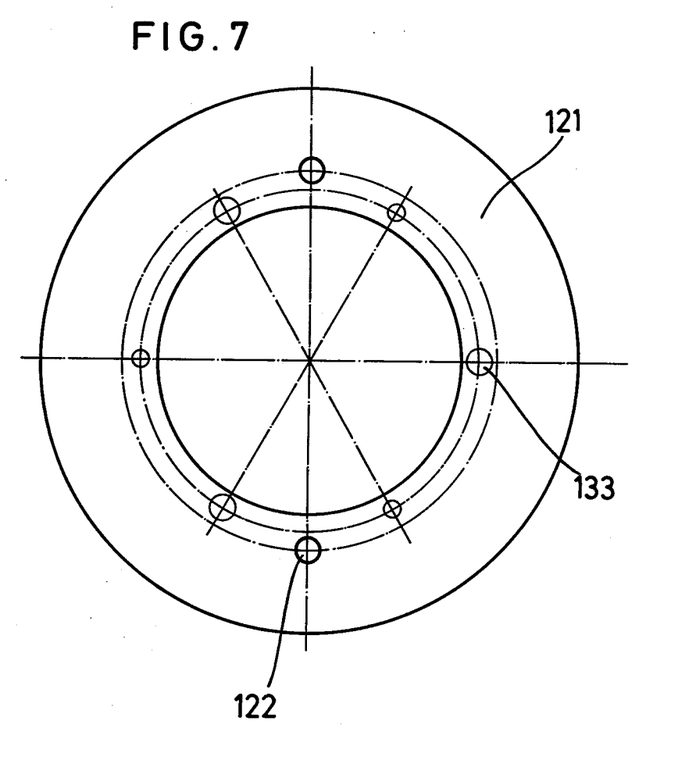
FIG. 7 shows the orifice plate according to FIG. 6 in plan view.

FIG. 5 shows the cover plate 24 with the secondary constrictor cross-sections 25, as used in FIGS. 1 and 2. FIGS. 6 and 7 show a modified orifice plate 121 which is integrally provided with axially directed protuberances 133 which form distance means. To facilitate fitting, these axially directed protuberances 133 are arranged on both faces of the orifice plate 121 so that erroneous installation of this orifice plate is impossible.

Figure 8:
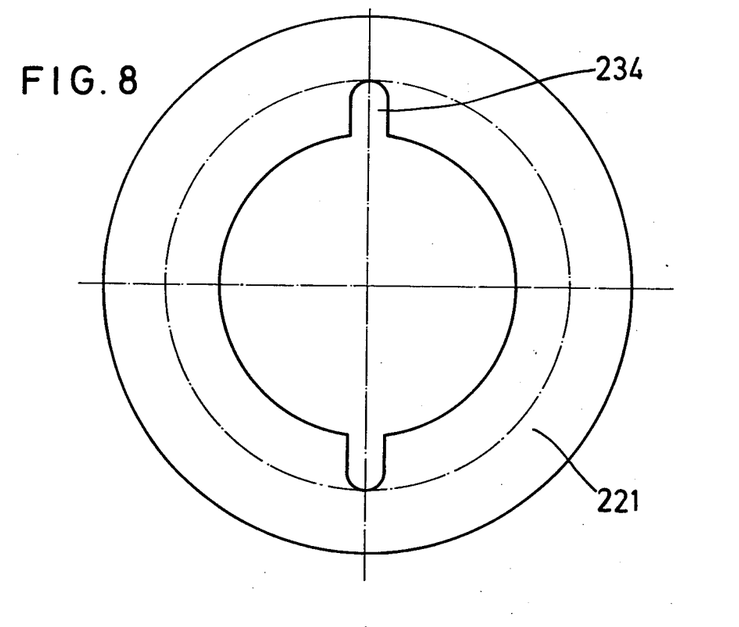
FIG. 8 shows an orifice plate, the pre-openings of which are formed to extend through inwards.

A further form of embodiment of an orifice plate 221 is shown in FIG. 8, where the pre-opening cross-sections 234 are formed by recesses which extend radially inwards and are opened towards the internal diameter. In combination with the distance washer 26 according to FIGS. 1 and 2, the pre-opening cross-section can easily be adapted to the desired damping characteristic curve course for the pre-opening by suitable selection of the external diameter of the distance washer.

Figure 9:
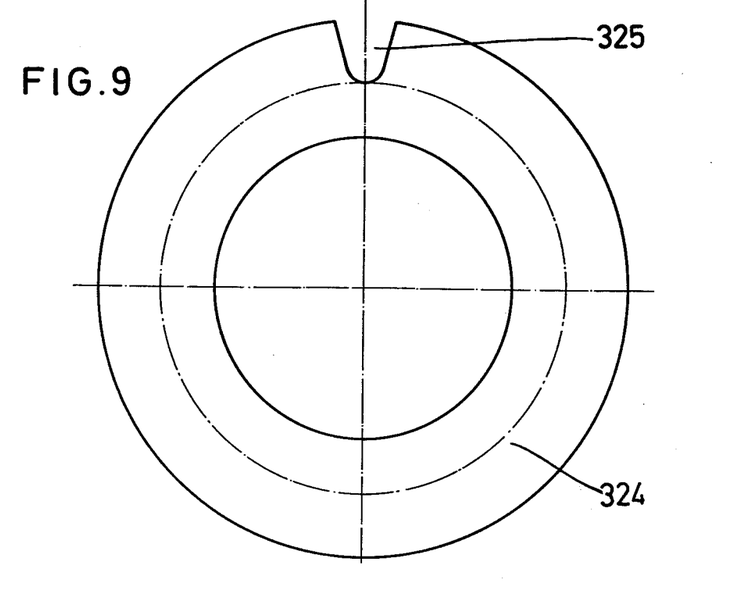
FIG. 9 shows a cover plate, the secondary constrictor cross-section of which is enlarged in the radial direction.
Figure 10:
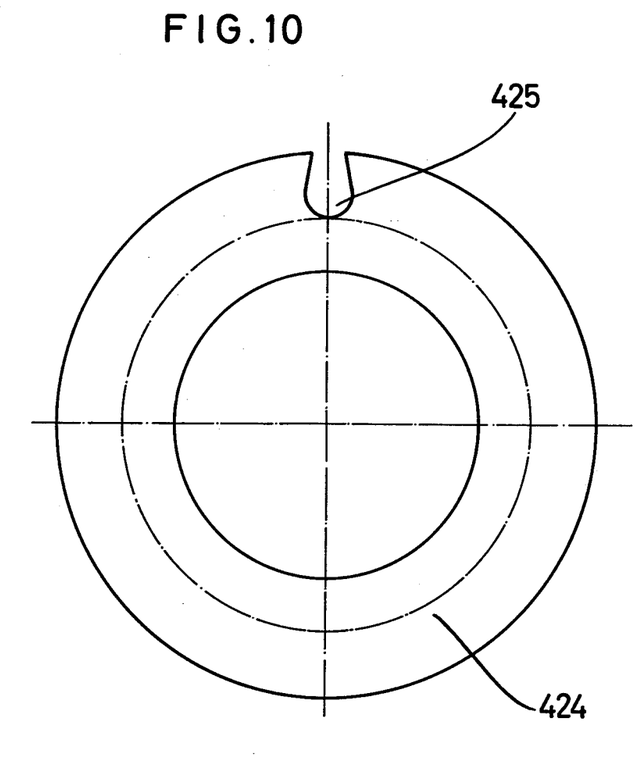
FIG. 10 shows a cover plate with radial cross-sectional reduction.

FIGS. 9 and 10 show different embodiments of the secondary constrictor cross-sections in the cover plate 325 and 424 respectively. Thus the secondary constrictor cross-section 325 according to FIG. 9 is shown widening radially outwards in cross-section so that such a secondary constrictor cross-section guarantees a further pressure reduction, while in FIG. 10 the secondary constrictor cross-section 425 has a radially outward cross-sectional reduction. Such a cross-sectional reduction has the effect that again a slight back pressure builds up in the secondary constrictor cross-section, which is advantageous in specific forms of embodiments since this achieves a further stabilisation of the flow.

Figure 11:
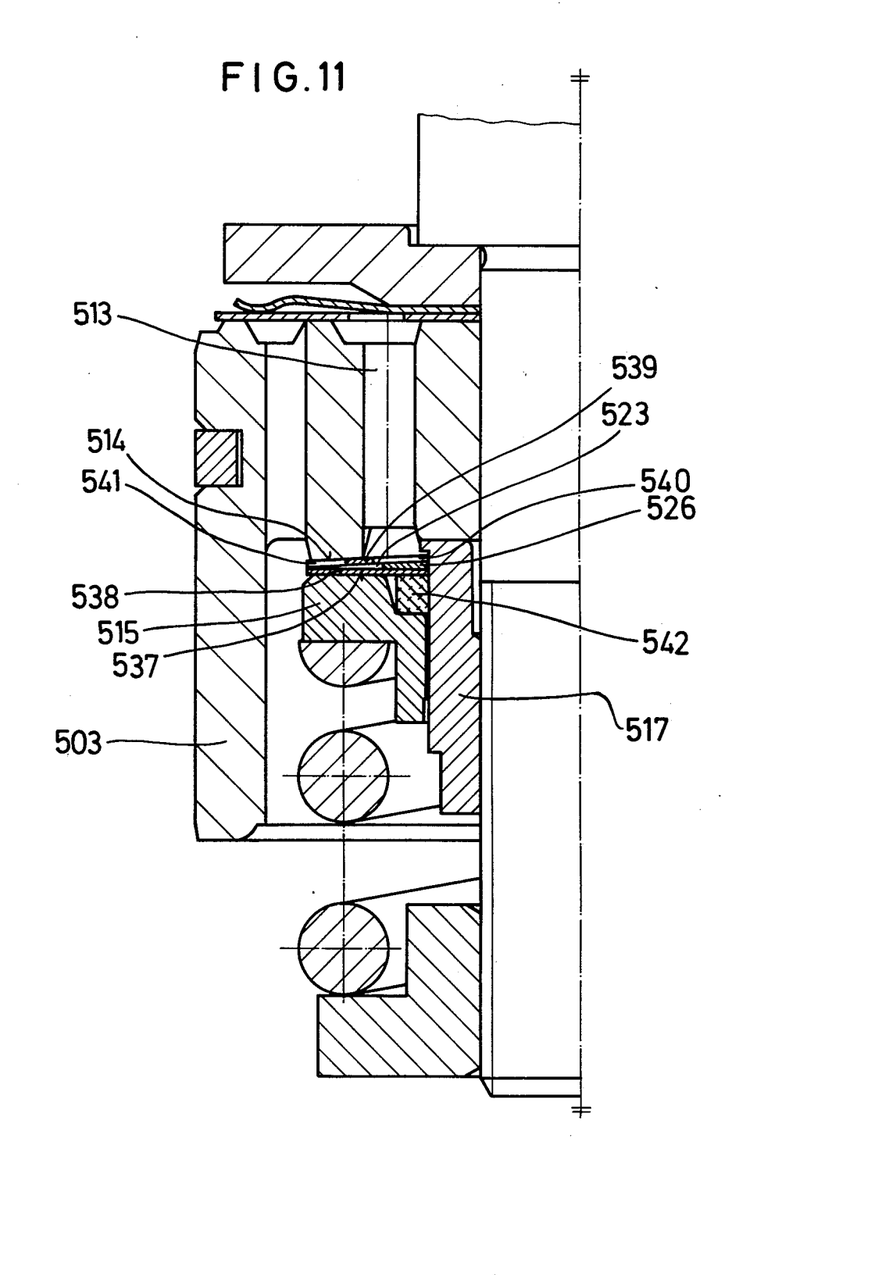
FIG. 11 shows a damping piston with a draw stage valve, the orifice plate of which forms a flat face in the installed condition.

The embodiment according to FIG. 11 of the damping valve in the piston 503 allocated to the draw stage differs from the embodiment according to FIG. 2 substantially in that the orifice plate 539 in the closed condition contacts a conical valve seat 514. On its one side the valve body 515 possesses a face 537 on which the cover plate 538 rests. Between the cover plate 538 and the orifice plate 539 the distance washer 526 is clamped so that again the annular space 523 is defined between the cover plate 538 and the orifice plate 539. Further, this embodiment differs from the embodiment of FIG. 2 in that the orifice plate 539 comprises both the pre-opening cross-sections 540 and the secondary constrictor cross-sections 541. The flow through the constantly open passage takes place via the damping passages 513 and the pre-opening cross-sections 540 provided in the orifice plate 539 into the annular space 523. This annular space 523, which is reduced radially outwards in cross-section, opens into the secondary constrictor cross-section 541. It can be seen that in such an embodiment the valve seat 514 can be made relatively wide without the cross-section of the annular space 523 being influenced by this. If an annular gap exists between the valve body 515 and the piston securing nut 517 as a result of large tolerances, it is expedient to provide a gasket 542 here in order not to produce any additional pre-opening cross-sections.

Figure 12:
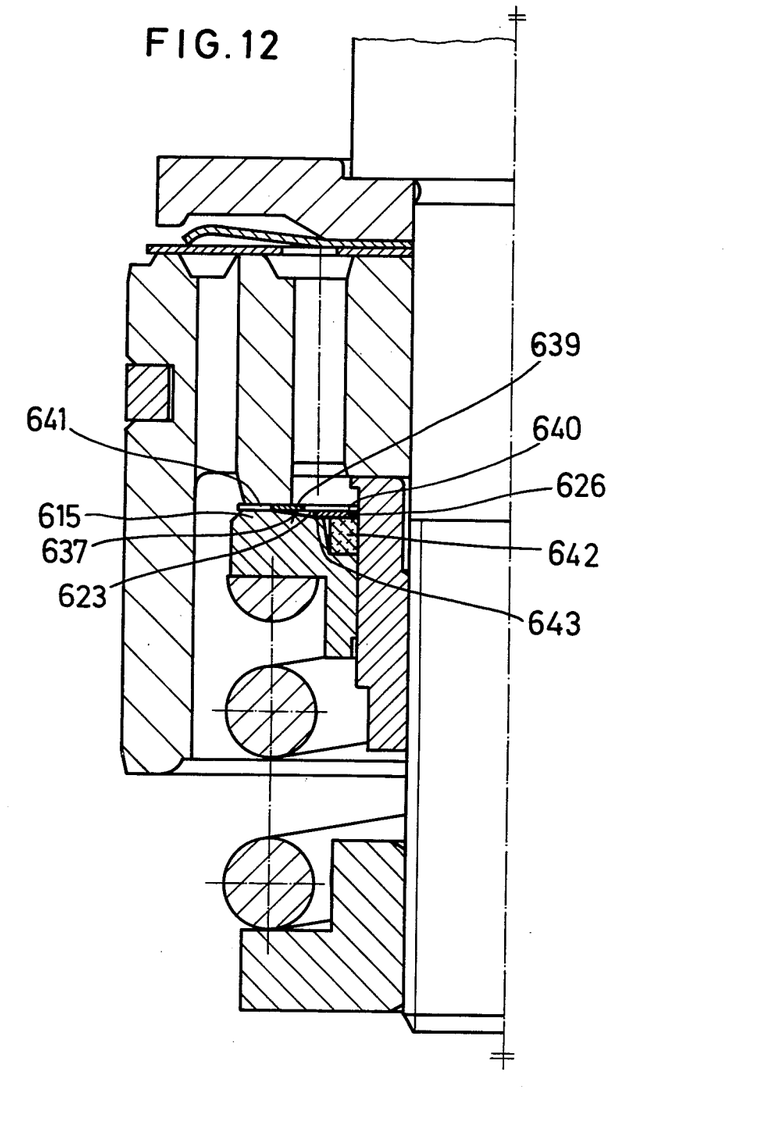
FIG. 12 shows the piston with a draw stage valve without cover plate.
Figure 13:
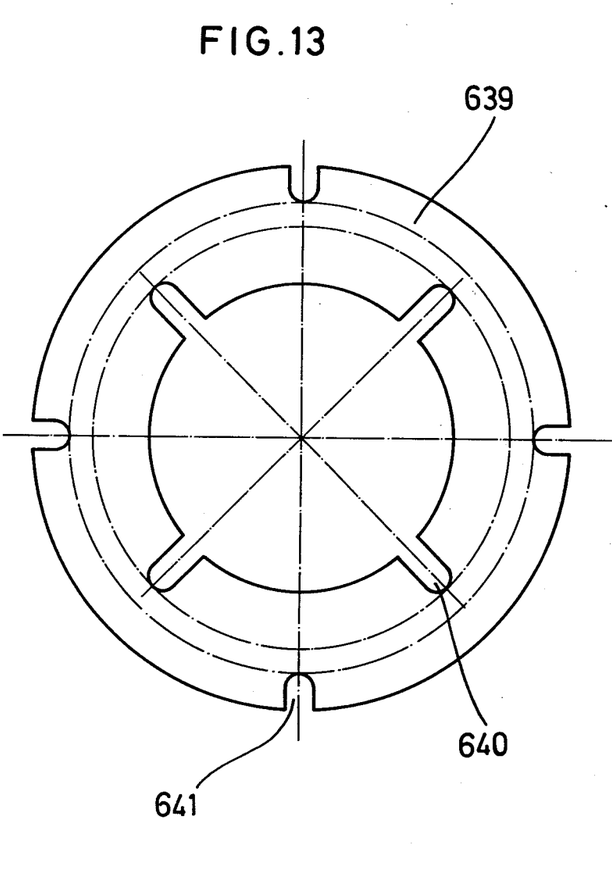
FIG. 13 shows the orifice plate according to FIGS. 11 and 12 in plan view.

In FIG. 12 an embodiment is shown which in comparison with that according to FIGS. 1 and 2 is essentially simplified in that the oblique face 637 in the valve body 615 limits the annular space 623 on one side. An abutment edge 643 is provided in the valve body 615 for the distance washer 626 which distance washer at the same time forms the abutment face for the gasket 642. The orifice plate 639 is provided as in FIG. 11 with the pre-opening cross-sections 640 and with the secondary constrictor cross-sections 641. This orifice plate 639 is represented as an individual part in FIG. 13. It can be seen that in this orifice plate 639 the angular association of the pre-opening cross-sections 640 with the secondary constrictor cross-section 641 is determined unambiguously.

Figure 14:
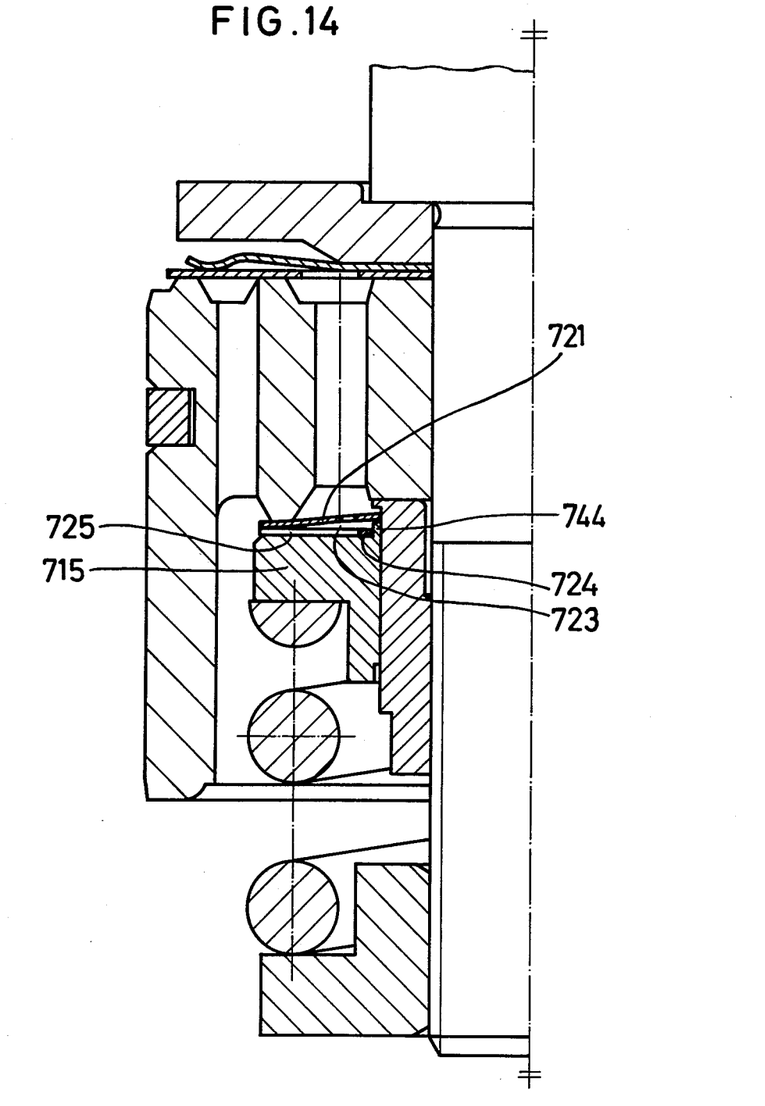
FIG. 14 shows a piston draw stage valve where the valve body is made in one piece with a protuberance as abutment for the orifice plate.

The embodiment according to FIG. 14 differs from that according to FIG. 2 in that in place of a distance washer the valve body 715 is provided with a protuberance 744 of circular formation which forms the abutment face for the orifice plate 721.

Figure 15:
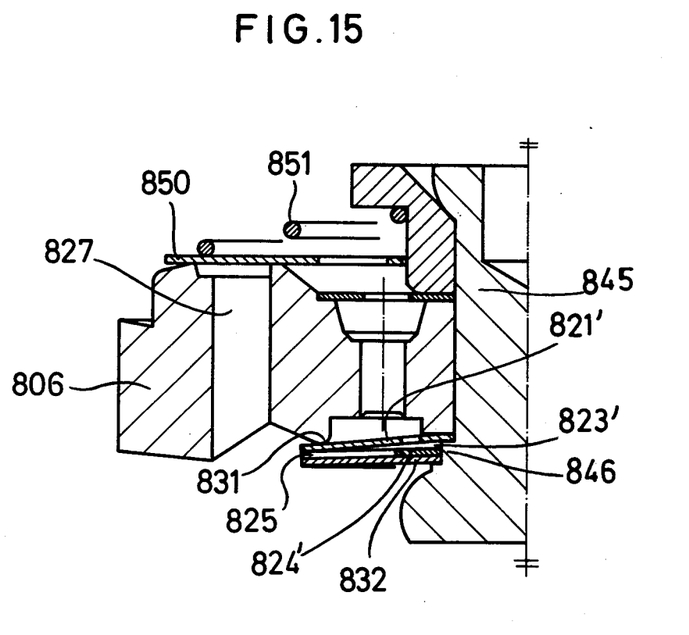
FIG. 15 shows a bottom valve the securing part of which, formed as rivet, carries the axially directed protuberance as abutment face for the orifice plate.

The bottom valve according to FIG. 15 differs from that according to FIG. 3 in that the securing part 845, formed as a rivet, is provided with the annular shoulder 846 and the orifice plate 821' is clamped in between the end of this annular shoulder 846 and the bottom valve body 806. The axial height of the annular shoulder 846 is selected so that the annular space 823' is formed between the cover plate 824' and the orifice plate 821'.

In all embodiments of this invention too rapid pressure decrease is prevented in the fluid passage chamber of continuously reduced axial height. The flow of the fluid is stabilised or tranquilized thereby. In the second opening a further pressure decrease occurs so that even with high pressure differences between the fluid chambers a noiseless operation is obtained.

In all embodiments the first wall member, i.e. the orifice plate, is of a simple flat design and can be easily made from a flat sheet material, particularly flat sheet metal by a punching operation. In some of the embodiments also the second wall member, for example, the plate 32 of FIG. 3 can be made of flat sheet material.

The embodiment of the first wall member, i.e. the orifice plate 121, is convenient because the protuberances 133 are provided on both sides of the orifice plate so that the orifice plate can't be erroneously mounted.

The embodiment of FIG. 2 is primarily adapted for very severe operational conditions, because on lifting the valve member 15 and the orifice plate 21 from the valve seat 14 no substantial deformation of the orifice plate 21 occurs. A further advantage of the embodiment of FIG. 1 is that the orifice plate 21, the annular distance member 26 and the cover plate 24 can be preassembled on the nut 17 due to the presence of the annular collar 19.

The invention is not limited to the double-tube shock absorber as illustrated in the drawing, but can likewise be used in other shock absorber constructions; by way of example it is readily conceivable to utilise such valve constructions in those shock absorbers where the damping is realised solely by piston valves or by piston valves in combination with passage openings on a shock absorber part.

We claim:

1. In a continuously open, throttling fluid passage device for hydraulic shock absorbers comprising two annular concentric wall members substantially perpendicular with respect to their common axis, namely, a first and a second wall member which cooperate in defining an annular fluid passage chamber, said fluid passage chamber being connected by at least one first substantially axially directed opening of said first wall member to a first fluid chamber and being further connected by at least one second substantially radially directed opening to a second fluid chamber, said second opening being located radially outward of said first opening, the improvement that the axial height of said fluid passage chamber substantially continuously decreases from the location of said first axially directed opening toward the location of said second radially outwardly directed opening, said first wall member contacts by its side remote from said fluid passage chamber a valve seat so as to define together with said valve seat an excess pressure valve, said excess pressure valve being opened, when the pressure in said first fluid chamber exceeds the pressure in said second fluid chamber by a predetermined amount.

2. The fluid passage device of claim 1, wherein said first wall member and said second wall member are mounted for common movement, when said first wall member is lifted from said valve seat.

3. The fluid passage device of claim 1, wherein said wall members are slidably guided by their radially inner edges on an axially extending guiding member for axial movement with respect to said valve seat, and wherein spring means are provided for biasing said wall members towards said valve seat.

4. The fluid passage device of claim 1, wherein said wall members are axially fixed on a support member by their radially inner edges and are biased towards said valve seat by internal elastic deformation.

5. The fluid passage device of claim 1, wherein an intermediate plate is positioned axially between said wall members, said intermediate plate being provided with at least one substantially radially directed slot adjacent its radially outer edge, said slot being open in radially outward direction so as to define said second opening.

6. The fluid passage device of claim 1, wherein said first wall member is provided with at least one substantially radially directed slot adjacent its radially outer edge, said slot being open in radially outward direction, the radial inner end of said slot being adjacent said valve seat, the radial outer end of said slot defining said second opening.

7. The fluid passage device of claim 1, wherein said first wall member is made of flat sheet material.

8. The fluid passage device of claim 1, wherein said second wall member is made of flat sheet material.

9. The fluid passage device of claim 1, wherein said second wall member is formed by an axially movable valve member.

10. The fluid passage device of claim 1, wherein spacer means are provided for defining a predetermined axial distance between said wall members at their radial inner edges, which axial distance is greater than the axial distance of said wall members at their radially outer edges.

11. The fluid passage device of claim 10, wherein said spacer means comprise an annular spacer member.

12. The fluid passage device of claim 10, wherein said spacer means comprise at least one axially directed protuberance on at least one of said wall members.

13. The fluid passage device of claim 12, wherein said one wall member is provided with protuberances on both sides.

14. The fluid passage device of claim 10, wherein said spacer means comprise an axially directed extension integral with one of said wall members.

15. The fluid passage device of claim 10, wherein said spacer means comprise a shoulder integral with a central support member supporting said wall members.

16. The fluid passage device of claim 1, wherein at least one of said wall members is formed as a plate of flat sheet material and said plate is deformed into conical shape, when said excess pressure valve is closed.

17. The fluid passage device of claim 1, wherein at least one of said wall members is provided with a conical face shaped thereon, said conical face being adjacent said fluid passage chamber.

18. The fluid passage device of claim 1, wherein said second opening has a cross-sectional area which is variable in radial direction.

19. The fluid passage device of claim 1, wherein said wall members are mounted on a central support member, said central support member being provided with axial abutment means for limiting the axial movement of one of said wall members, said central support member being provided with fastening means for being fastened on a further constructional member of said shock absorber.

20. In a continuously open, throttling fluid passage device for hydraulic shock absorbers comprising two annular concentric wall members substantially perpendicular with respect to their common axis, namely, a first and a second wall member which cooperate in defining an annular fluid passage chamber, said fluid passage chamber being connected by at least one first substantially axially directed opening of said first wall member to a first fluid chamber and being further connected by at least one second substantially radially directed opening to a second fluid chamber, said second opening being located radially outward of said first opening, the improvement that the axial height of said fluid passage chamber substantially continuously decreases from the location of said first axially directed opening toward the location of said second radially outwardly directed opening, said first wall member is made of flat sheet material, and spacer means are provided for defining a predetermined axial distance between said wall members at their radially inner edges, which axial distance is greater than the axial distance of said wall members at their radially outer edges.

21. In a continuously open, throttling fluid passage device for hydraulic shock absorbers comprising two annular concentric wall members substantially perpendicular with respect to their common axis, namely, a first and a second wall member which cooperate in defining an annular fluid passage chamber, said fluid passage chamber being connected by at least one first substantially axially directed opening of said wall member to a first fluid chamber and being further connected by at least one second substantially radially directed opening to a second fluid chamber, said second opening being located radially outward of said first opening, the improvement that the axial height of said passage chamber substantially continuously decreases from the location of said first axially directed opening toward the location of said second radially outwardly directed opening, and an intermediate plate is positioned axially between said wall members, said intermediate plate being provided with at least one substantially radially directed slot adjacent its radially outer edge, said slot being open in the radially outward direction so as to define said second opening.

* * * * *